United States Patent [19]
Roetker et al.

[11] Patent Number: 5,535,772
[45] Date of Patent: Jul. 16, 1996

[54] TANK VENTING CONTROL SYSTEM

[75] Inventors: John J. Roetker; Robert S. Harris, both of Connorsville, Ind.

[73] Assignee: Stant Manufacturing Inc., Connorsville, Ind.

[21] Appl. No.: 431,442

[22] Filed: May 1, 1995

[51] Int. Cl.⁶ .................................................. F16K 17/196
[52] U.S. Cl. ........................... 137/43; 137/202; 137/493; 137/510; 137/587
[58] Field of Search .......................... 137/43, 202, 493, 137/510, 587

[56] References Cited

U.S. PATENT DOCUMENTS

| | | | |
|---|---|---|---|
| 4,666,058 | 5/1987 | Harris | 137/43 |
| 4,760,858 | 8/1988 | Szlaga | 137/43 |
| 4,816,045 | 3/1989 | Szlaga et al. | 55/168 |
| 4,953,583 | 9/1990 | Szlaga | 137/118 |
| 4,974,645 | 12/1990 | Johnson | 137/587 |
| 4,991,615 | 2/1991 | Szlaga et al. | 137/43 |
| 5,028,244 | 7/1991 | Szlaga | 137/202 |
| 5,065,782 | 11/1991 | Szlaga | 137/43 |
| 5,156,178 | 10/1992 | Harris | 137/43 |
| 5,215,132 | 6/1993 | Kobayashi | 137/587 |
| 5,234,013 | 8/1993 | Roetker | 137/43 |
| 5,261,439 | 11/1993 | Harris | 137/43 |

*Primary Examiner*—Robert G. Nilson
*Attorney, Agent, or Firm*—Barnes & Thornburg

[57] ABSTRACT

A venting control system is provided for controlling discharge of fuel vapors from a vehicle fuel tank. The system includes a vent apparatus mountable in an aperture formed in the top wall of the fuel tank. The vent apparatus is formed to include a vapor inlet opening communicating with an interior region of the fuel tank, a vapor outlet opening, and a passageway interconnecting the vapor inlet and outlet openings. The system further includes a tubular skirt having an uppermost end coupled to the vent apparatus and a lowermost end and a fill-limit valve assembly coupled to the lowermost end of the tubular skirt. The tubular skirt and the fill-limit valve assembly are positioned to lie in the interior region of the fuel tank when the vent apparatus is mounted in the top wall aperture of the fuel tank.

46 Claims, 10 Drawing Sheets

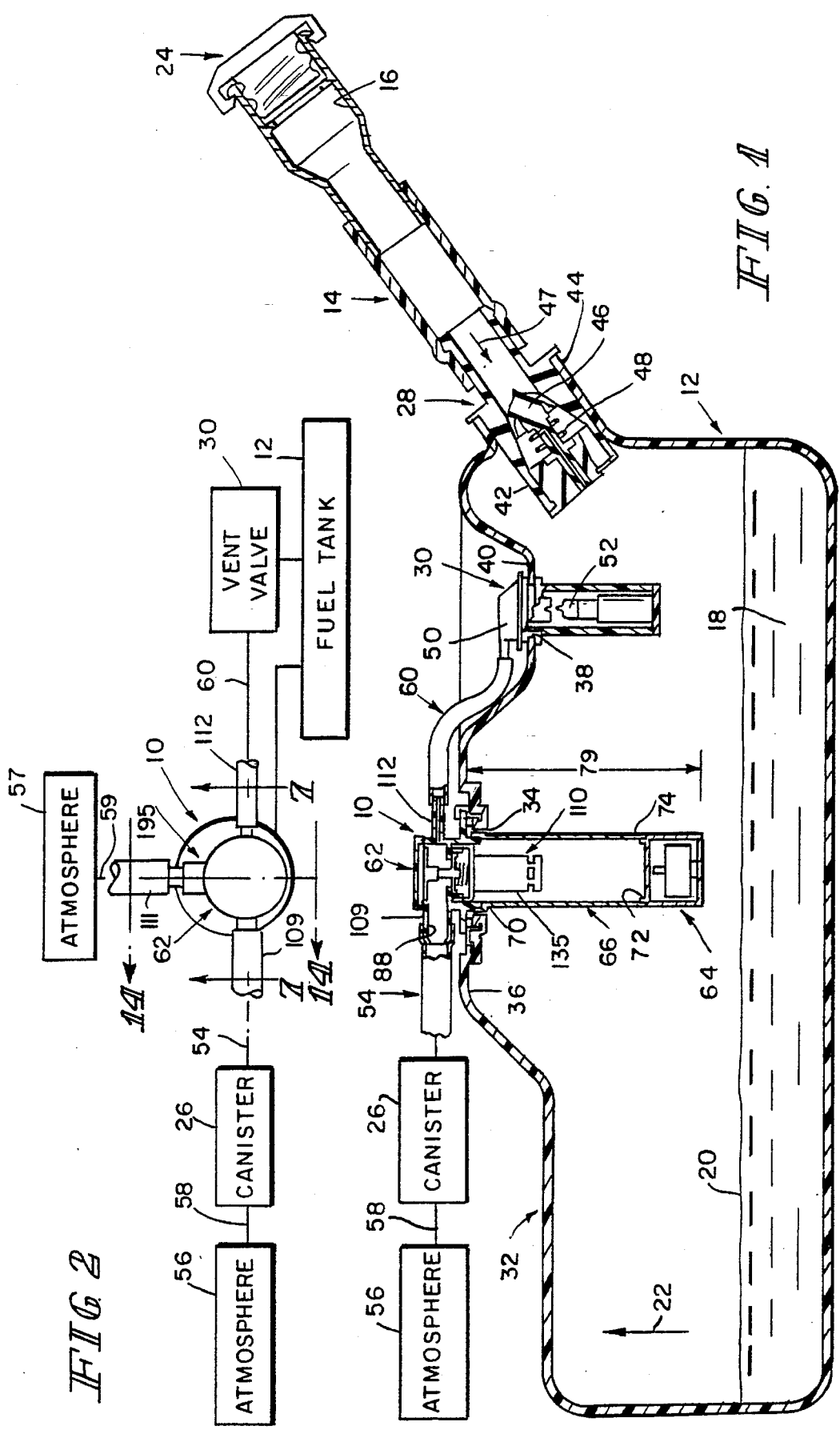

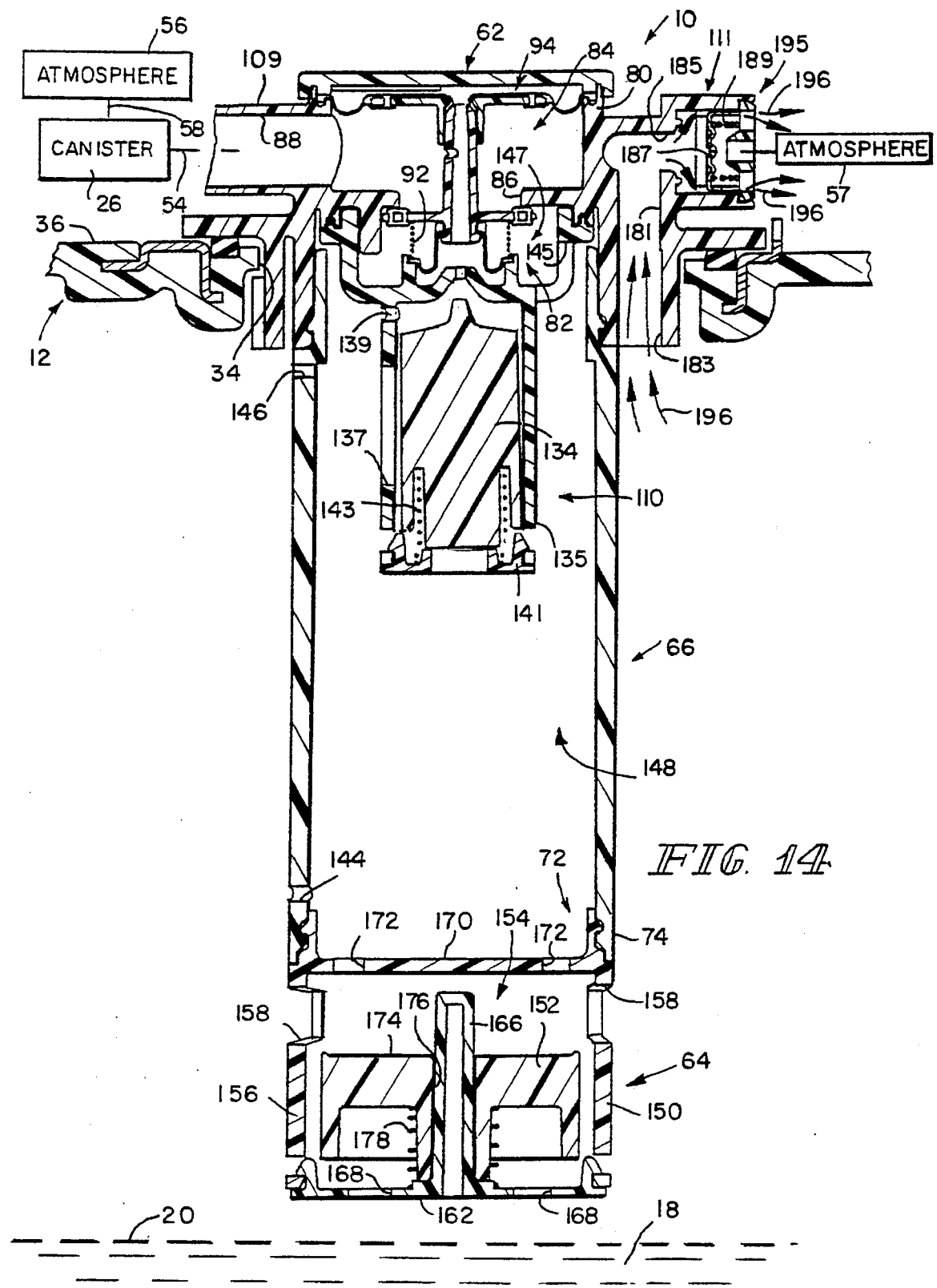

TANK VENTING CONTROL SYSTEM

BACKGROUND AND SUMMARY OF THE INVENTION

The present invention relates to systems for controlling venting of fuel vapors from a vehicle fuel tank, and particularly to venting apparatus which operates to seal the vapor space in the interior of a fuel tank during refueling and reopens at some point after refueling has been completed to vent the vapor space. More particularly, the present invention relates to a refueling ventilation and fill-limit system for controlling tank ventilation and for preventing overfilling of a fuel tank.

Management of fuel vapor on-board a vehicle is an important part of modern vehicle fuel system design. A tank venting control assembly for selectively discharging fuel vapor pressure in response to the development of high tank pressure conditions and for introducing air into the fuel tank in response to the development of vacuum conditions therein is disclosed, for example, in U.S. Pat. No. 5,234,013 to Roetker et al.

Fuel vapor can be created in the fuel tank by temperature differences between the fuel tank and liquid fuel from a fuel pump, as well as by sloshing and agitation of the fuel tank during normal vehicle operation. The pressure buildup resulting from the creation of new fuel vapors must be relieved properly. For this reason, many vehicle fuel systems are equipped with tank venting control assemblies capable of discharging a relatively large amount of fuel vapor in response to the development of high pressure conditions in the fuel tank.

In addition to providing for adequate fuel vapor discharge from the fuel tank during high tank pressure conditions, well-designed tank pressure control assemblies must be capable of responding to a reduction of pressure in the fuel tank to below a predetermined level. These tank vacuum conditions are usually relieved by introducing ambient air into the fuel tank to bring the fuel vapor pressure in the fuel tank back to approximately atmospheric pressure. However, it has long been problematic to provide adequate tank vacuum relief functions without complicating a tank venting control assembly unnecessarily.

It is well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle (and thus referred to as "On-Board Refueling Vapor Recovery" systems or "ORVR" systems) were developed. See, for example, U.S. Pat. No. 4,816,045 to Szlaga et al., relating to a vapor-recovery system mounted on the fuel tank filler neck. ORVR systems which mount to a fuel tank have also been developed as shown, for example, in U.S. Pat. No. 5,156,178 to Harris.

In addition to controlling vapor escape, well-designed ORVR systems also assist in controlling the amount of liquid fuel which can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, an ORVR system is usually provided with a "fill-limit" control system which assists in triggering the nozzle shut-off mechanism when the level of liquid fuel in the fuel tank has risen to a predetermined level. See, for example, the fill-limit control systems disclosed in U.S. Pat. No. 4,816,045 to Szlaga et al and U.S. application Ser. No. 08/241,186, filed May 11, 1994 to Harris.

It has also long been recognized that fuel vapor is generated in the fuel tank during operation of the vehicle, for example, by evaporation or by sloshing of the liquid fuel against the walls of the tank. Excessive pressure can build up in the fuel tank as a result of the newly formed fuel vapor unless control devices are provided to vent the fuel vapor from the fuel tank during vehicle operation. Such valves have been referred to as "run-loss" valves or tank-venting rollover valves because they handle fuel vapor loss during vehicle run and are capable of preventing liquid fuel carry-over during vehicle rollover.

Fuel pump nozzles are known to include a fill-limiting sensor for shutting of the flow of fuel from the nozzle when the fuel tank is nearly filled. Typically, this fill-limiting sensor is triggered whenever the fuel tank is full and fuel "backs up" the filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

It has been observed that fuel pump operators are able to manually override or bypass some fill-limiting sensors on nozzles by continuing to pump fuel after the pump nozzle has automatically shut off several times. This practice has come to be called the "trickle-fill" method of introducing liquid fuel into a fuel tank. Using this well-known trickle-fill method, the fuel pump operator "clicks" or squeezes the lever handle on the pump nozzle slowly two or three times in succession after automatic nozzle shut-off has occurred in order to introduce more fuel into the fuel tank without actuating the fill-limiting sensor right away. It will be appreciated that such trickle-fill practices can result in overfilling the fuel tank which can effectively reduce the fuel vapor expansion capacity in the vapor space available within the filled fuel tank.

Vehicle fuel systems are known to include valves for venting the vapor space in a fuel tank. See, for example, U.S. Pat. Nos. 4,760,858; 4,991,615; and 5,028,255.

What is needed is a fill-limit and tank ventilation control system that is able to vent fuel vapor from the vapor space in a fuel tank during early stages of refueling but block introduction of any and all liquid fuel in excess of a maximum volume so as to preserve a minimum volume of the vapor space in the fuel tank once the fuel tank is filled to its maximum capacity with fuel. Ideally, this fill-limit and tank ventilation control system could be included as one component in a comprehensive On-Board Refueling Vapor Recovery (ORVR) vehicle fuel system. An ORVR system is used to manage fuel vapor recovery during all phases of vehicle use. In addition, a fill-limit control system that is adaptable to permit customers some latitude to trickle-fill their fuel tanks without overfilling the fuel tanks would be welcomed by fuel customers and vehicle makers.

It will be understood that each vehicle has a custom-designed fuel tank sized and shaped to mount onto a particular vehicle underbody. That being the case, one can begin to understand why a single fill-limit and tank ventilation valve assembly might not be of the proper size to fit into every custom-designed vehicle fuel tank. It will be understood that certain "tall" (i.e., vertical height) valves do not fit well in small-capacity, compact vehicle fuel tanks characterized by short vertical height. Few vehicle manufacturers wish to carry in inventory a separate valve assembly for each manufactured vehicle. What is needed is a modular fill-limit and tank ventilation valve assembly that can be adapted easily to fit into a wide variety of vehicle fuel tanks.

Vehicle manufacturers would welcome a modular fill-limit and tank ventilation valve assembly that could be assembled using a series of standardized parts to produce tall, short, or medium height valve assemblies to produce a "customized" valve assembly that is sized to fit properly in a vehicle fuel tank of a particular size and shape. In such a system, all components including valves would be standardized and modularized and other modular components would be used to connect the standardized valve components together so as to establish a customized vertical height for each modular fill-limit and tank ventilation valve assembly. System costs could be minimized and manufacturing schedules could be improved if such a modular valve assembly could be configured.

According to the present invention, a venting control system is provided for controlling discharge of fuel vapors from a vehicle fuel tank. The venting control system includes a vent apparatus mountable in an aperture formed in a top wall of the fuel tank. The vent apparatus is formed to include a vapor inlet opening communicating with an interior region of the fuel tank, a vapor outlet opening, and a passageway interconnecting the vapor inlet opening and the vapor outlet opening. The system further includes a tubular skirt having an uppermost end coupled to the vent apparatus and a lowermost end arranged to extend downwardly away from the vent apparatus and a fill-limit valve assembly coupled to the lowermost end of the tubular skirt. The tubular skirt and the fill-limit valve assembly are positioned to lie in the interior region of the fuel tank when the vent apparatus is mounted in the top wall aperture of the fuel tank.

Pressurized fuel vapor in a fuel tank carrying a venting control system in accordance with the present invention is vented from the fuel tank to a vapor-recovery canister or other destination through channels and passageways formed in the tubular skirt and the vent apparatus. In preferred embodiments, the vent apparatus includes a pressure-relief and vacuum-relief valve assembly and a rollover valve assembly for regulating flow of fuel vapor, air, and liquid fuel into and out of the fuel tank through the venting control system.

Also in preferred embodiments, the lowermost end of the tubular skirt is formed to include a skirt inlet for admitting pressurized fuel vapor and liquid fuel from the fuel tank into a channel formed in the tubular skirt and coupled to the vapor inlet opening formed in the overlying vent apparatus. The fill-limit valve assembly is coupled to the lowermost end of the tubular skirt and configured to control flow of pressurized fuel vapor and liquid fuel from the fuel tank into the tubular skirt channel.

The fill-limit valve assembly illustratively includes a fill-limit valve housing having an interior region and a float valve contained therein. The float valve is movable in the interior region of the fill-limit valve housing between an opened position allowing flow of fuel vapor and liquid fuel from the fuel tank into the channel in the tubular skirt through the skirt inlet and a closed position preventing flow of fuel vapor and liquid fuel from the fuel tank into the channel in the tubular skirt through the skirt inlet. The buoyant float valve is moved by rising liquid fuel in the fuel tank to its closed position at a late stage during tank refueling to block gross passage of liquid fuel into the channel formed in the tubular skirt through the skirt inlet. Thus, the float valve functions to prevent liquid fuel from exiting the fuel tank through the tubular skirt and the vent apparatus in the venting control system in accordance with the present invention during refueling.

Another aspect of the present invention is that the venting control system illustratively includes snap-connected modular components. This modular venting control system comprises a standardized vent apparatus, a standardized fill-limit valve assembly, and tubular skirts of many different lengths. In use, a venting control system sized to fit in a particular custom-designed fuel tank can be made by interconnecting the standardized vent apparatus and fill-limit valve assembly using a tubular skirt having an appropriate length. Assembly of these modular parts is made easy by using a first snap-connector to couple the uppermost end of the tubular skirt to the overlying vent apparatus and a second snap-connector to couple the lowermost end of the tubular skirt to the underlying fill-limit valve assembly.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a diagrammatic "plan view" of the diagrammatic tank venting system of FIG. 1;

FIG. 7 is a sectional detail view of the fill-limit and tank ventilation valve assembly of FIG. 1 taken along lines 7—7 of FIG. 1 in a static condition at low fuel level in the fuel tank when no venting is occurring;

FIG. 14 is a sectional detail view of the fill-limit and tank ventilation valve assembly of FIG. 1 taken along line 14—14 of FIG. 1 showing use of an auxiliary pressure-relief valve to vent pressurized fuel vapor from the fuel tank to the atmosphere.

DETAILED DESCRIPTION OF THE DRAWINGS

Figure 1:
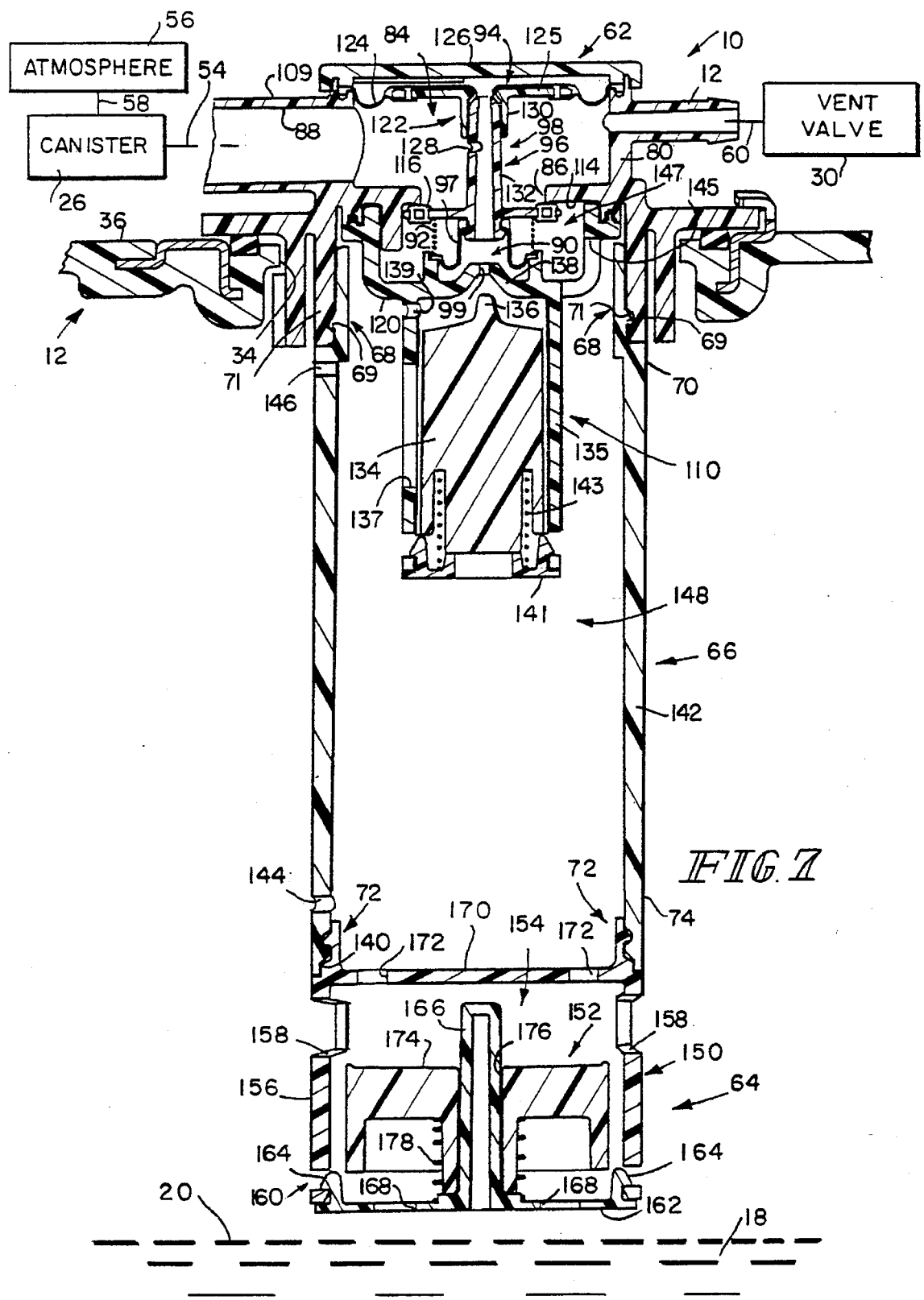
FIG. 1 is a diagrammatic illustration of a tank venting system in accordance with the present invention coupled to a fuel tank unit, the system including a fill-limit and tank ventilation valve assembly mounted on a vapor dome included in the fuel tank unit, a run-loss valve assembly mounted on a top wall of the fuel tank unit, an inlet check valve assembly in a filler neck coupled to the fuel tank unit, and a vapor recovery canister coupled to the fill-limit and tank ventilation valve assembly.

A presently preferred embodiment of an On-board Refueling Vapor Recovery (ORVR) fuel system is shown in FIG. 1. A fill-limit and tank ventilation valve 10 in accordance with the present invention is included in this system and is mounted preferably as shown in a fuel tank 12 having a filler neck 14. Illustratively, filler neck 14 has a mouth 16 for receiving a fuel-dispensing pump nozzle (not shown) during refueling. This nozzle is used by a pump operator to introduce liquid fuel 18 into fuel tank 12 during refueling. As fuel tank 12 is filled during refueling, the top surface 20 of liquid fuel 18 will rise in direction 22 a shown in FIG. 1. Normally, a removable cap 24 is used to close the mouth 16 of filler neck 14.

The ORVR system also includes a vapor-recovery canister 26 designed to capture and store fuel vapors that are generated and displaced in the fuel tank during a typical vehicle refueling operation. The ORVR system also illustratively includes an inlet check valve assembly 28 mounted in filler neck 14 and a run-loss or other vent valve 30 mounted in a top wall 32 of fuel tank 12. Illustratively, fill-limit valve 10 is mounted in an aperture 34 formed in an upper tier portion 36 of tank top wall 32 and run-loss valve 30 is mounted in an aperture 38 formed in a lower tier portion 40 of tank top wall 32.

Filler neck 14 and inlet check valve assembly 28 cooperate to define a fuel-delivery control system. Reference is hereby made to U.S. patent application Ser. No. 08/346,785, filed Nov. 30, 1994, to Harris, which application is incorporated by reference herein, for a description of a suitable fuel-delivery control system. Assembly 28 includes a housing module 42 that fits in fuel tank inlet 44 and a spring-loaded slide member 46 that moves in housing module 42 to regulate flow of liquid fuel and fuel vapor between filler neck 14 and fuel tank 12. Spring 48 is mounted normally to urge slide member 46 to the flow-blocking position shown in FIG. 1. During refueling, liquid fuel admitted into housing module 42 through filler neck 14 strikes slide member 46 and urges slide member 46 inwardly in direction 47 to compress spring 48. Once refueling is complete, spring 48 functions to restore slide member 46 to its flow-blocking position.

Run-loss or vent valve 30 is provided to regulate discharge of liquid fuel and fuel vapor from fuel tank 12. Reference is hereby made to U.S. Pat. No. 5,028,244 to Szlaga, which patent is incorporated by reference herein, for a description of a suitable run-loss valve. Run-loss valve 30 illustratively includes a pressure-relief valve assembly 50 and an underlying float valve 52. Preferably, run-loss valve 30 is mounted inside fuel tank 12 so that float valve 52 closes a venting aperture formed in pressure-relief valve assembly 50 during tank refueling before a valve mechanism included in fill-limit valve 10 moves to a position causing a venting aperture formed in fill-limit valve 10 to be closed (See FIG. 11). To that end, run-loss valve 30 is mounted on the lower tier portion 40 of the top wall 32 of fuel tank 12.

As shown diagrammatically in FIGS. 1 and 2, pressurized fuel vapor can be discharged from fill-limit valve 10 to vapor-recovery canister 26 through tube 54 and on to the atmosphere 56 through tube 58. Also, pressurized fuel vapor can be discharged from run-loss valve 30 through tube 60 to fill-limit valve 10 and on to vapor-recovery canister 26 through tube 54 and the atmosphere 56 through tube 58. Further in certain cases, fuel vapor can be discharged from fill-limit valve 10 to atmosphere 57 through tube 59 (see, for example, FIG. 14).

Figures 3, 4, 5:
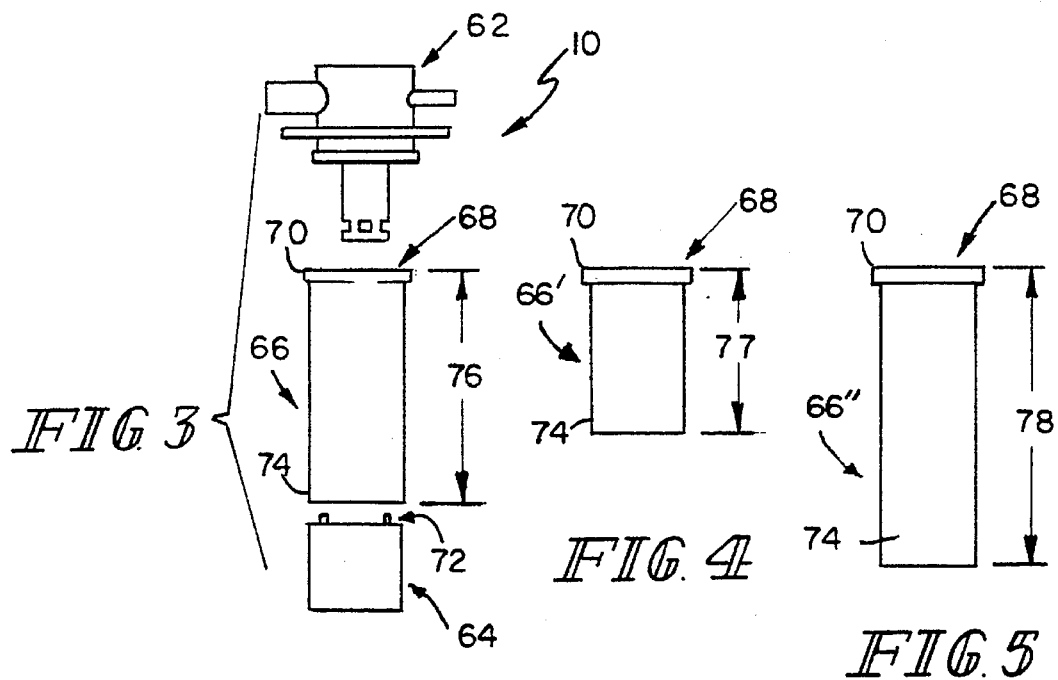
FIG. 3 is an exploded view of modular components (e.g., vent apparatus, tubular skirt, and fill-limit valve assembly) included in the fill-limit and tank ventilation valve assembly of FIG. 1 showing a "middle-length" tubular skirt.
FIG. 4 is a side elevation view of a "short-length" tubular skirt that could be selected to replace the middle-length tubular skirt in the modular valve assembly shown in FIG. 3.
FIG. 5 is a side elevation view of a "long-length" tubular skirt that could be selected to replace the middle-length tubular skirt in the modular valve assembly shown in FIG. 3.

Fill-limit valve 10 is illustratively an assembly of modular components as shown best in FIG. 3. Fill-limit valve 10 includes a vent apparatus 62, a fill-limit valve assembly 64, and an elongated tubular skirt 66 interconnecting vent apparatus 62 and fill-limit valve assembly 64. Preferably, a set of first snap-connectors 68 is provided to couple an uppermost end 70 of tubular skirt 66 to overlying vent apparatus 62 and a set of second snap-connectors 72 is provided to couple a lowermost end 74 of tubular skirt 66 to underlying fill-limit valve assembly 64 as shown diagrammatically in FIG. 3 and in more detail in FIG. 7.

Figure 6:
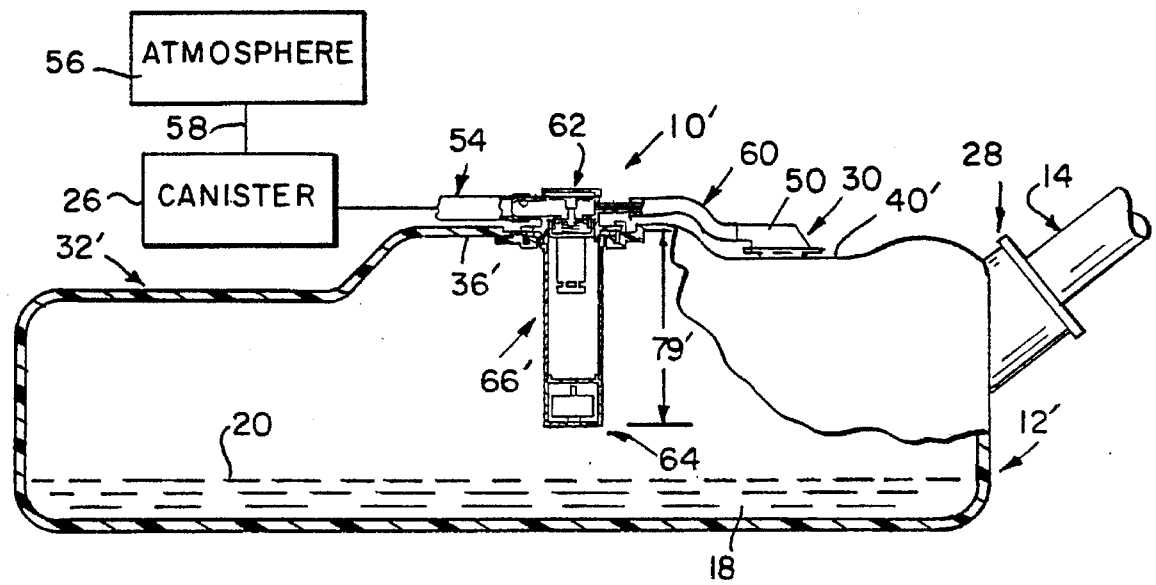
FIG. 6 is a view similar to FIG. 1 showing a more compact smaller volume fuel tank (than the tank shown in FIG. 1) including a modular fill-limit and tank ventilation valve assembly constructed using the short-length tubular skirt shown in FIG. 4.

The tubular skirt 66 shown in FIG. 3 has a middle length 76 whereas the tubular skirt 66' shown in FIG. 4 has a relatively short length 77 and the tubular skirt 66" shown in FIG. 5 has a relatively long length 78. Skirts 66' and 66" have snap-connector means so as to be interchangeable with skirt 66 in fill-limit valve 10. As such, it is now possible to change the effective height 79 (see FIG. 1) of fill-limit valve 10 inside fuel tank 12 simply by interconnecting vent apparatus 62 and underlying fill-limit valve assembly 64 using a modular tubular skirt such as 66, 66', 66", or the like. For example, fuel tank 12' shown in FIG. 6 is more compact and has a smaller capacity than fuel tank 12 in FIG. 1 and fill-limit valve assembly 10' has a shorter effective height 79' inside tank 12' because it is assembled using modular short-length tubular skirt 66'.

Vent apparatus 62 includes a valve housing 80 containing a pressure/vacuum-relief valve assembly 82 in a passageway 84 formed in housing 80. Housing 80 is formed to include a vapor inlet opening 86 and a vapor outlet opening 88 interconnected in fluid communication by passageway 84. Reference is hereby made to U.S. Pat. No. 5,234,013 to Roetker et al., which patent is hereby incorporated by reference herein, for a description of a suitable tank venting control assembly in vent apparatus 62.

Vent apparatus 62 is provided for controlling venting of fuel vapor through aperture 34 in fuel tank 12. Vent apparatus 62 comprises a housing 80 mounted in the aperture 34 and a valve 82 movable in the housing 80 between a blocking position preventing flow of fuel vapor from the fuel tank 12 through the housing 80 and a venting position allowing flow of fuel vapor from the fuel tank 12 through the housing 80. A spring 92 biases the valve 82 upwardly towards its blocking position as shown in FIG. 7. A vent actuator mechanism of the type disclosed in the Roetker et al. '013 patent is provided for using fuel vapor from the fuel tank 12 to move the valve 82 against the spring 92 towards its venting position as shown, for example, in FIG. 8. The vent actuator mechanism includes a venting control chamber 94 receiving pressurized fuel vapor from the fuel tank 12 in an extensible conduit 96 communicating fuel vapor from the fuel tank 12 to the venting control chamber 94. The extensible conduit 96 includes a first passageway portion 97 (defined by an aperture formed in partition 120) and a second passageway portion 98 (defined by a pair of interconnected sleeves 130, 132) movable relative to the first passageway portion 94 to define an intermediate passageway portion 90. Vent apparatus 62 further includes a flexible partition 99 extending between the valve 82 and the first passageway portion 97 to provide a barrier to prevent fuel vapor venting through the housing 80 from entering the intermediate passageway portion 90 to vary the pressure therein.

Vent apparatus 62 is designed to be mounted in an aperture 34 formed in a top wall 32 of a fuel tank 12 as shown, for example, in FIG. 7. Vent apparatus 62 has a vapor outlet opening 88 connected to a fuel vapor treatment device 26 such as, for example, a charcoal-filled vapor-recovery canister.

Valve housing 80 of vent apparatus 62 is formed to include a hollow interior which is divided into a lower chamber housing a rollover valve assembly 110, and an upper chamber including an inner portion housing valve 82 and an outer portion defined by passageway 84. Valve housing 80 is formed to include a first outlet 109 defining vapor outlet opening 88 and a second outlet 111 at a right angle to the first outlet 109 as shown best in FIG. 2. First outlet 109 is coupled to vapor-recovery canister 26 and second outlet 111 discharges excess fuel vapor to atmosphere 57.

Valve housing 80 also includes an inlet 112 for communicating pressurized fuel vapor discharged from run-loss valve 30 through tube 60 in the upper portion 84 in valve housing 80. Valve housing 80 is thus a part of two vent paths for pressurized fuel vapor being discharged from fuel tank 12 to vapor-recovery canister 26. Pressurized fuel vapor can pass from fuel tank 12 to vapor-recovery canister 26 along one path through vapor inlet opening 86 in valve housing 80 or along another path through inlet 112 in valve housing 80. These vent paths will be illustrated in more detail below.

Valve 82 in vent apparatus 62 is movable between a blocking position (shown in FIG. 7) and a venting position (shown in FIG. 8) in response to fuel vapor pressure changes in fuel tank 12. When in its blocking position, valve 82 seats against a valve seat 114. A gasket 116 is provided to ensure a sealing engagement between valve 82 and valve seat 114. Valve 82, when thus seated, blocks flow of pressurized fuel vapor from the interior region of fuel tank 12 to vapor-recovery canister 26 through vapor inlet opening 86 in valve housing 80. When moved away from valve seat 114 to its venting position, valve 82 allows flow of pressurized fuel vapor from fuel tank 12 to vapor-recovery canister 26 through vapor inlet opening 86. Spring 92 acts between a flow shield 120 and valve 82 normally to bias valve 82 toward its blocking position as shown in FIG. 7.

Figure 8:
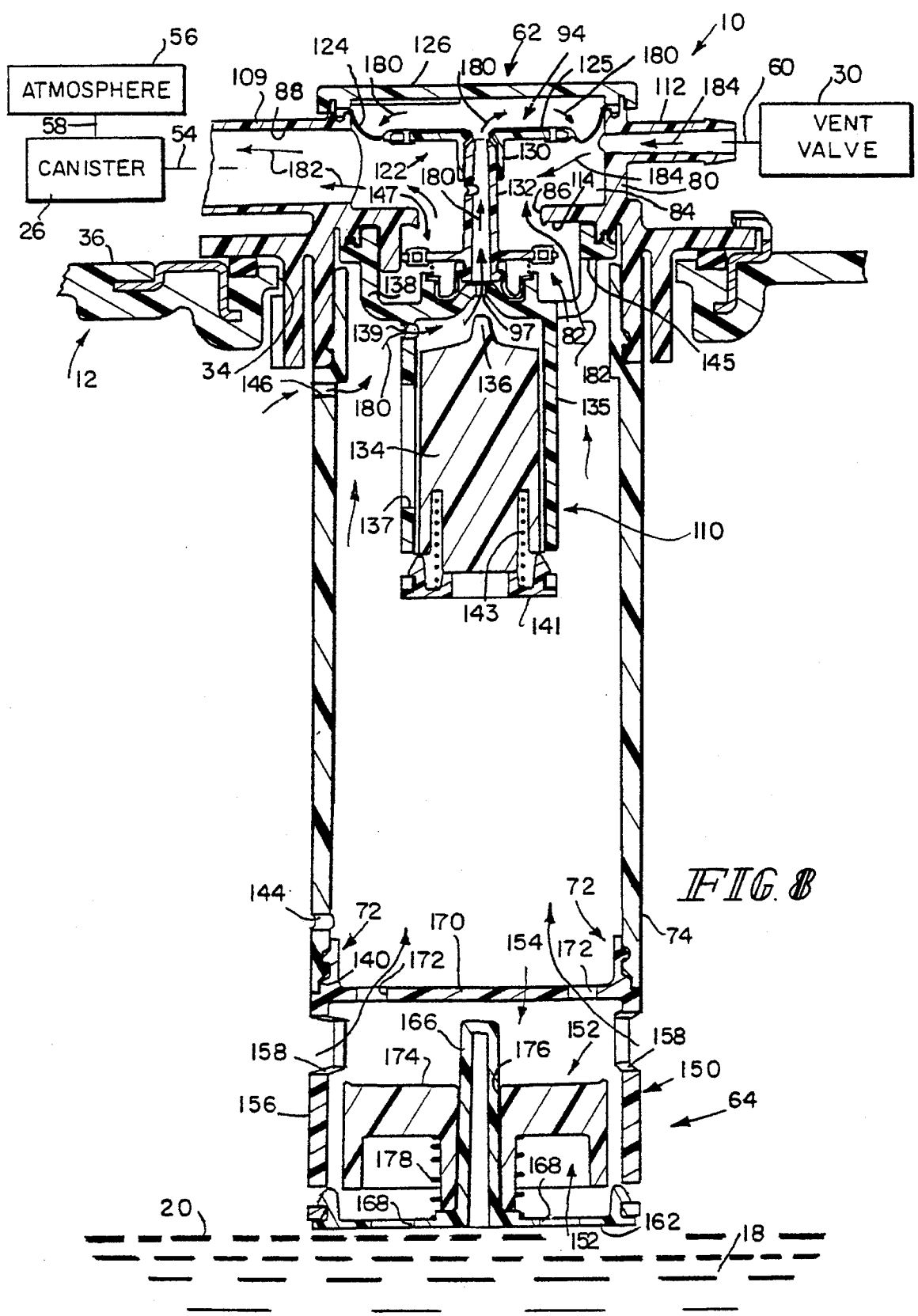
FIG. 8 is a view similar to FIG. 7 showing venting of pressurized fuel vapor from the interior region of the tank to the vapor recovery canister through the fill-limit valve assembly, tubular skirt, and vent apparatus following movement of a pressure-relief valve in the vent apparatus to an opened position as liquid fuel is dispensed into the fuel tank during refueling.

Valve actuator 122 is provided to move valve 82 from its blocking position shown in FIG. 7 against spring 92 to its venting position shown in FIG. 8 when fuel vapor pressure in fuel tank 12 exceeds a predetermined level. Pressurized fuel vapor from fuel tank 12 is corralled in venting control chamber 94 used to depress valve actuator 122, which in turn urges valve 82 downwardly in the manner described below toward its venting position shown in FIG. 8.

Valve actuator 122 includes a round diaphragm 124 or other suitable resilient sealing material having its peripheral edge mounted inside housing 80 as shown in FIG. 7. Diaphragm 124 cooperates with valve housing cover 126 to define venting control chamber 94 for receiving and using a pressurized fuel vapor signal from the interior region of fuel tank 12 to apply a downwardly directed force against a top side 125 of diaphragm 124. The sleeves 130, 132 defining second portion 98 of conduit 96 are formed to include a bleed passageway 128 to connect venting control chamber 94 in fluid communication with vapor outlet opening 88. Thus, pressurized fuel vapor accumulating in venting control chamber 94 eventually dissipates through bleed passageway 128 to vapor outlet opening 88 formed in valve housing 80 and is conducted onto vapor-recovery canister 26.

Diaphragm 124 is movable inside housing 80 in response to an accumulation of fuel vapor pressure in venting control chamber 94 between a static position (shown in FIG. 7) allowing valve 82 to remain in its blocking position seated against valve seat 114 and an actuating position (shown in FIG. 8) urging valve 82 away from seat 114 against the bias of spring 92 toward its venting position. Second portion 98 of extensible conduit 96 includes an upper sleeve 130 and a lower sleeve 132 as shown in FIG. 7. Advantageously, as shown in FIG. 7, and in FIG. 13, sleeves 130 and 132 cooperate to provide a slip joint enabling valve 82 to move away from seat 114 toward its venting position without valve diaphragm 124 moving away from its static position toward its actuating position. This feature allows valve 82 to function as a vacuum-relief valve as shown best in FIG. 13. That is, when fuel vapor pressure in fuel tank 12 is reduced to below a predetermined level, valve 82 can move away from its valve seat 114 (without being actuated by valve actuator 122) to restore the fuel tank 12 to approximately atmospheric pressure.

Sleeves 130 and 132 also cooperate to provide a portion of a conduit 96 for transmission of a small volume of pressurized fuel vapor from fuel tank 12 to venting control chamber 94 to provide the pressure actuation signal to diaphragm 124. As has been noted, the pressurized fuel vapor signal must be transported from the interior region of fuel tank 12 to venting control chamber 94 to perform its function.

Figure 11:
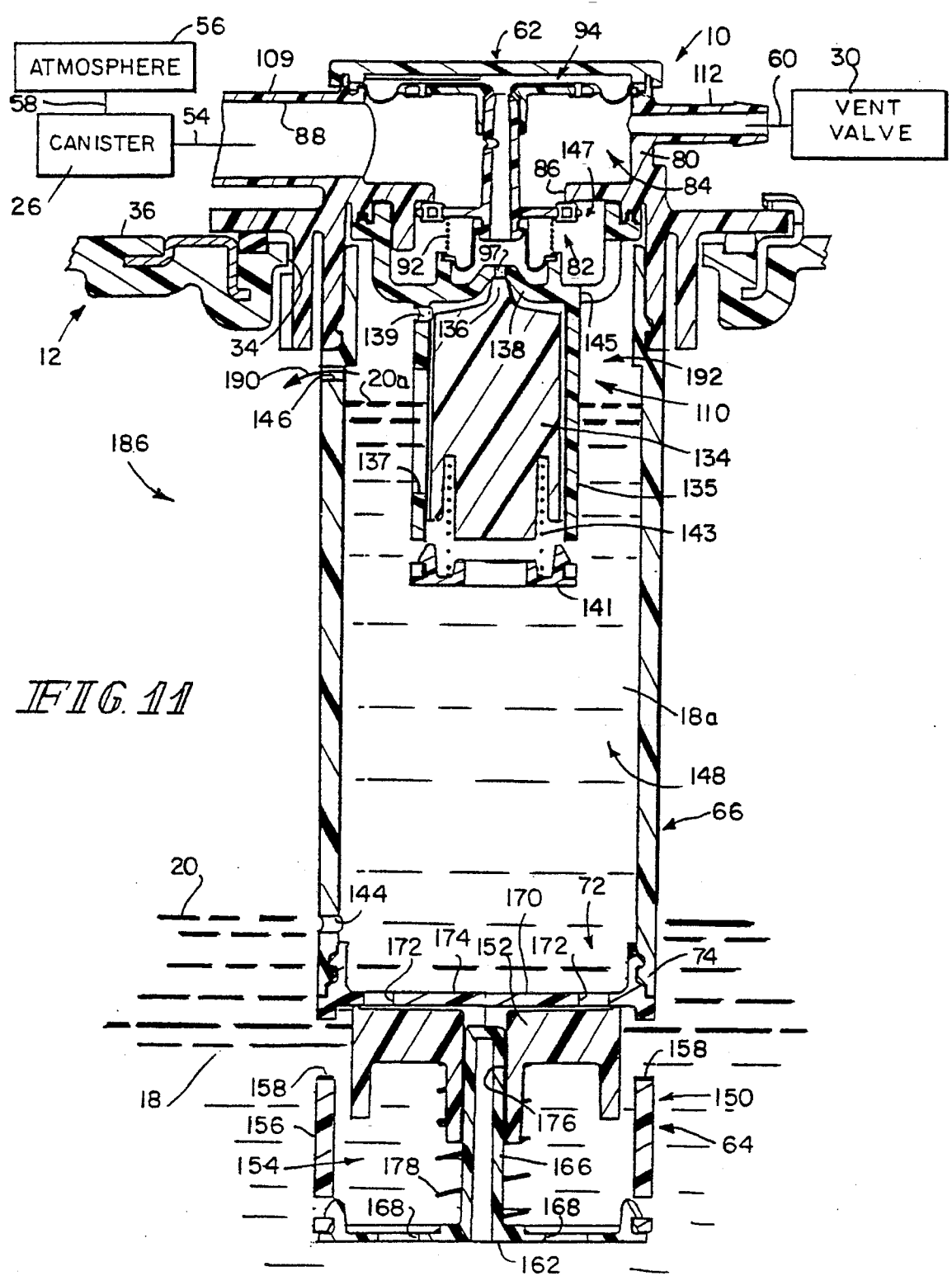
FIG. 11 is a view similar to FIGS. 7–10 showing that if a pump operator continues to add more and more fuel into the filler neck using the trickle-fill technique, the level of liquid fuel in the channel formed in the tubular skirt will ultimately rise to a point high enough to apply a buoyancy force to a rollover float valve included in the vent apparatus and suspended in the channel formed in the tubular skirt to move the rollover float valve to a position closing a passage leading to a pressure-relief valve-actuating differential pressure diaphragm to control closing the vapor inlet opening formed in the vent apparatus.

Vent apparatus 62 is also provided with a rollover valve assembly 110 as previously noted. Although any of a number of designs may be used, a preferred rollover valve assembly includes a spring-biased float valve 134 or other liquid discriminator inside a tubular valve housing 135 as shown in FIG. 7. Float valve 134 includes a nipple 136 arranged and sized to block the flow of pressurized fuel vapor and also liquid fuel through the aperture 97 formed in partition 138 as shown in FIG. 11. Valve housing 135 is a tubular member depending from flow shield 120 and surrounding aperture 97 formed in partition 138. Valve housing 135 is formed to include a tall lower inlet opening 137 and a small upper inlet opening 139 as shown in FIG. 7. A bottom plate 141 is fixed to the distal end of valve housing 135 and a compression spring 143 is placed in valve housing 135 to act against float valve 134 and bottom plate 141 and assist in raising float valve 134 toward its closed position.

Tubular skirt 66 is formed to include a skirt inlet 140 at the lowermost end 74 of the annular side wall 142 defining tubular skirt 66 as shown in FIG. 7. Annular side wall 142 is also formed to include a lower side wall aperture 144 formed in lowermost end 74 and an upper side wall aperture 146 formed in uppermost end 70 of annular side wall 142 as shown in FIG. 7. These apertures 144, 146 conduct fuel vapor from the fuel tank 12 into tubular skirt 66 when the skirt inlet 140 is closed by fill-limit valve assembly 64 as shown, for example, in FIGS. 9 and 10. Also, liquid fuel can drain out of channel 148 formed in tubular skirt 66 as shown, for example, in FIG. 12, and fuel vapor can exit tubular skirt 66 as shown, for example, in FIG. 11 when the skirt inlet 140 is closed by fill-limit valve assembly 64.

Tubular skirt 66 is coupled to overlying vent apparatus 62 by snap-connector means 68 so that annular side wall 142 surrounds rollover valve assembly 110 and defines an annular channel 148 therebetween. Thus, any pressurized fuel vapor admitted into the channel 148 formed in tubular skirt 60 through either skirt inlet 140, lower side wall aperture 144, or upper side wall aperture 146 will be communicated through channel 148 to vapor-recovery canister 26 through vapor inlet opening 86 formed in valve housing 80 when valve 82 is moved to its venting position as shown in FIG. 8. As shown in FIG. 8, partition 120 is formed to include at least one aperture 145 for conducting fuel vapor from channel 148 formed in tubular skirt 66 into a chamber 147 defined between partition 120 and valve seat 114. Any pressurized fuel vapor in chamber 147 will pass into passageway 84 through vapor inlet opening 86 once valve 82 is moved to its opened position as shown, for example, in FIG. 8.

Uppermost end 70 of tubular skirt 66 includes fist snap-connectors 69 around its periphery. These first snap-connectors 69 are arranged to engage mating snap-connector portions 71 formed on an annular flange included in valve housing 80 to define snap-connector means 68. As noted previously, such a snap-connector feature facilitates assembly of a modular fill-limit valve including a snap-together vent apparatus 62 and a tubular skirt 66.

Fill-limit valve assembly 64 includes a fill-limit valve housing 150 appended to lowermost end 74 of tubular skirt 66 and a float valve 152 positioned inside an interior region 154 of fill-limit valve housing 150 for movement therein. Float valve 152 is movable between an opened position shown in FIGS. 7–10, allowing flow of pressurized flow vapor from fuel tank 12 into channel 148 formed in tubular skirt 66 through skirt inlet 140, and a closed position shown in FIGS. 11 and 12 preventing flow of pressurized fuel vapor from fuel tank 12 into channel 148 through skirt inlet 140.

Fill-limit valve housing 150 includes an annular side wall 156 formed to include one or more inlet apertures 150 and a bottom opening 160 and a floor 162 positioned to lie under float valve 152 and coupled to annular side wall 156 to cower bottom opening 160. Floor 162 includes snap-connectors 164, an upstanding post 166 extending into interior region 154, and several inlet apertures 168 lying around the base of upstanding post 166 as shown, for example, in FIG. 7.

Fill-limit valve housing 150 further includes a ceiling 170 defining a top boundary of chamber 154 and lying in vertically spaced-apart parallel relation to floor 162 to position movable float 152 therebetween. Ceiling 170 is formed to include several (e.g., four) inlet ports 172 interconnecting chamber 154 in fill-limit valve housing 150 and channel 148 in tubular skirt 66 in fluid communication. Float valve 152 includes a top wall 174 positioned to engage underside 176 of ceiling 170 in chamber 154 in sealing relation to close each inlet port 172 formed in ceiling 170 to block liquid fuel flow therethrough in response to movement of float valve 152 to its closed position as shown, for example, in FIG. 9.

Figure 9:
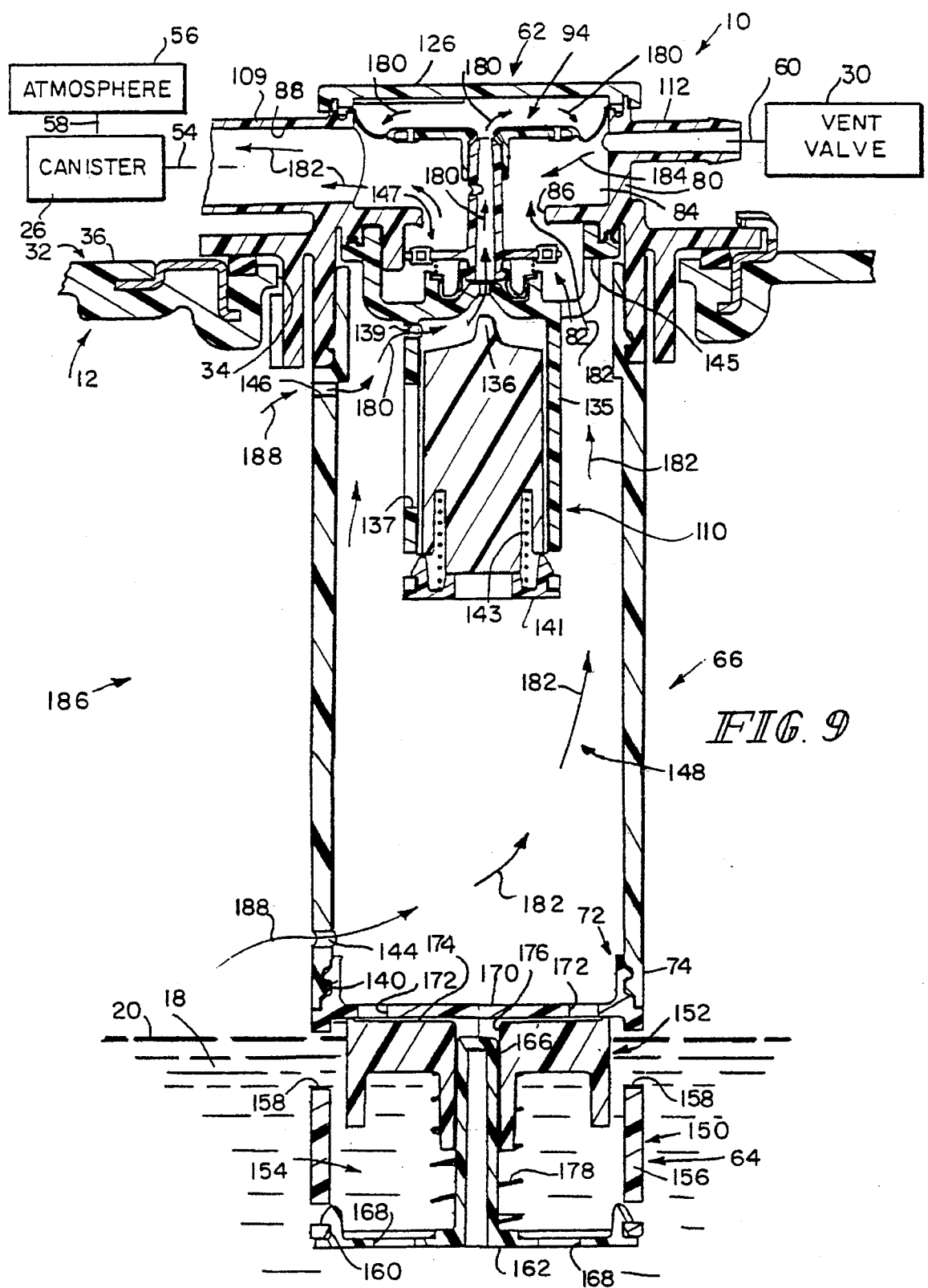
FIG. 9 is a view similar to FIGS. 7 and 8 showing movement of a buoyant float valve in the fill-limit valve assembly to a closed position, blocking flow of liquid fuel and fuel vapor into the tubular skirt through a downwardly opening skirt inlet formed in a lowermost end of the tubular skirt at the point in time after the liquid fuel level inside the fuel tank has risen to its 95% full level and showing that some pressurized fuel vapor is still able to vent from the fuel tank to the vapor recovery canister through upper and lower side wall apertures formed in the tubular skirt.

Movable float valve 154 is formed to include a central aperture 176 receiving fixed upstanding guide post 166 therein as shown, for example, in FIGS. 7 and 9. Fill-limit valve assembly 64 further includes a compression spring 178 winding around a sleeve 180 appended to float valve 152 and journaled on upstanding guide post 166. An upper end of spring 178 engages the underside of float valve 152 and a lower end of spring 178 engages a top side of floor 162 as shown, for example, in FIG. 7. In operation, a rising level 20 of liquid fuel 18 in fuel tank 12 can raise float valve 152 in chamber 154 from an opened position allowing flow of pressurized fuel vapor from fuel tank 12 into channel 148 formed in tubular skirt through inlet apertures 158 formed in annular side wall 156, chamber 154 formed in valve housing 150, and inlet ports 172 formed in ceiling 170 as shown, for example, in FIG. 8 to a closed position shown, for example, in FIG. 9.

Illustratively, second snap-connectors 72 are used to suspend fill-limit valve assembly 64 from lowermost end 74 of cantilevered tubular skirt 66. As shown in FIG. 7, one portion of each second snap-connector is appended to ceiling 170 and arranged to extend upwardly toward rollover valve assembly 110 to engage a mating portion arranged to lie below lower side wall aperture 144 and appended to lowermost end 74 of tubular skirt. As noted previously, such a snap-connector feature facilitates assembly of a modular fill-limit valve including a snap-together vent apparatus 62, tubular skirt 66, and fill-limit valve assembly 64.

Operational stages of fill-limit valve 10 during a typical fuel tank refueling sequence are shown in FIGS. 1 and 7–12. Initially, the level 20 of liquid fuel 18 in fuel tank 12 is rather low as shown in FIG. 1. At relatively low fuel vapor pressure levels in fuel tank 12, no venting through fill-limit valve 10 is occurring and valve 82 is closed, rollover float valve 134 is opened, and fill-limit float valve 152 is opened as shown in FIG. 7.

During refueling, the top surface 20 of liquid fuel 18 rises to a point just below floor 162 in fill-limit valve 10 as shown in FIG. 8. At this stage, the pressure level of fuel vapor in fuel tank 12 is high enough to cause valve 82 to move to its opened position. As shown in FIG. 8, a small amount of pressurized fuel vapor 188 passes from fuel tank 12 into venting control chamber 94 through upper inlet opening 139 in rollover valve housing 135, aperture 97 in partition 138, and conduit 96 (e.g., sleeves 130, 132).

Once the pressure level of fuel vapor 180 inside venting control chamber 94 exceeds a predetermined threshold level, the pressurized fuel vapor 180 acts to apply a downward force to top surface 125 of diaphragm 124 causing diaphragm 124 to move downwardly to the position shown in FIG. 8. This movement causes sleeve 130 to urge sleeve 132 and its companion valve 82 downwardly so as to move valve 82 to its opened position venting pressurized fuel vapor 182 in fuel tank 12 to vapor-recovery canister 26 though aperture 45 in partition 138, chamber 147, vapor inlet opening 86, passageway 84, vapor outlet opening 88 in tube 109, and tube 54. Also, as shown in FIG. 8, some pressurized fuel vapor 184 is venting from fuel tank 12 through vent valve 30 and this fuel vapor 184 passes through inlet tube 112 and passageway 84 in fill-limit valve 10 on its way to vapor-recovery canister 26.

Once the level 20 of liquid fuel 18 in fuel tank 12 has risen to its 95% full level as shown in FIG. 9, float valve 152 in fill-limit valve assembly 64 moves to its closed position. This arrests aspiration of displaced fuel vapor in fuel tank 12 and blocks gross passage of liquid fuel 18 into channel 148 in tubular skirt 66 through skirt inlet 140 (e.g., inlet ports 172 formed in ceiling 170). However, pressurized fuel vapor 188 inside vapor space 186 of fuel tank 12 can still vent to venting control chamber 94 and separately to canister 26 by first passing into channel 148 in tubular skirt 66 through one or both of lower and upper side wall apertures 144, 146 as also shown in FIG. 9.

Figure 10:
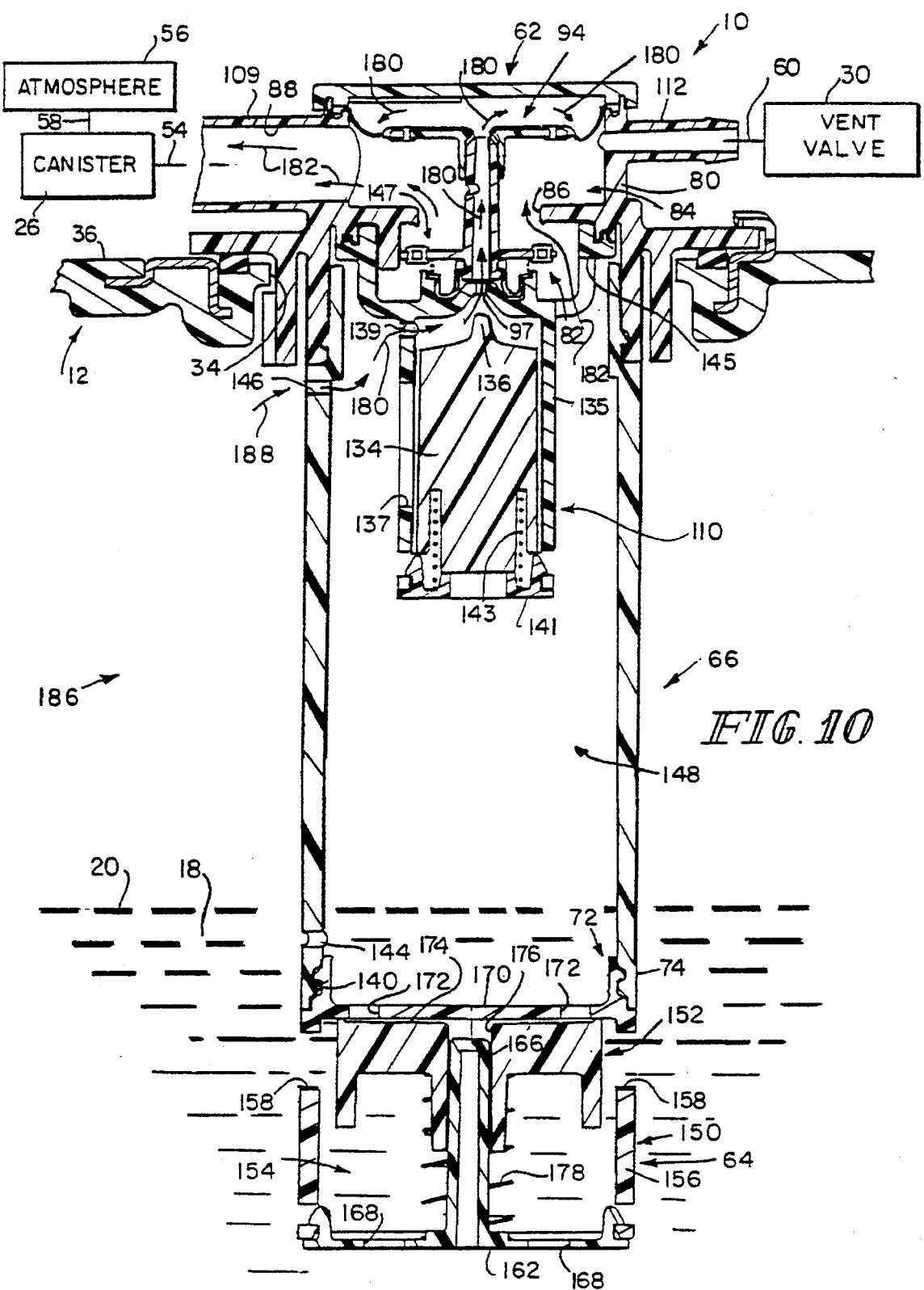
FIG. 10 is a view similar to FIGS. 7–9 showing closure of the lower side wall aperture formed in the tubular skirt at a point in time after the liquid fuel level inside the fuel tank has risen to its 100% full level and showing continued venting of pressurized fuel vapor in the vapor space of the fuel tank to the vapor recovery canister through the upper side wall aperture formed in the tubular skirt.

As shown in FIG. 10, the level 20 of liquid fuel 18 in fuel tank 12 has risen to its "nominal" 100% full level determined by the elevation and position of lower side wall aperture 144 within fuel tank 12. It is expected that a pump operator might have to use the trickle-fill method once or twice to raise the level 20 of liquid fuel 18 in the fuel tank to this 100% full level. Reference is again made to U.S. application Ser. No. 08/241,186 to Harris for a detailed description of how a skirt formed to include a side wall aperture functions to block overfilling of a fuel tank beyond a predetermined capacity. Even though liquid fuel 18 effectively "closes" lower side wall aperture 144, pressurized fuel vapor 188 in vapor space 186 of fuel tank 12 is still able to vent to venting control chamber 94 and separately to vapor-recovery canister 26 by first passing through upper side wall aperture 146 as shown in FIG. 10.

At this stage, if a pump operator continues to add more and more liquid fuel into filler neck 14 using the trickle-fill technique, the level 20a of liquid fuel 18a in channel 148 formed in tubular skirt 66 will ultimately rise to a point shown in FIG. 11 that is high enough to apply a buoyancy force to rollover float valve 134 to raise float valve 134 to its closed position. In a presently preferred embodiment, this point is reached after about 15 successive overfill (i.e., trickle-fill) attempts by a pump operator. That is after a pump operator clicks or squeezes the lever handle on the pump nozzle (not shown) slowly about fifteen times in succession after the first automatic nozzle shut-off has occurred. Once float valve 134 is moved to its closed position as shown in FIG. 11, fuel vapor no longer passes into venting control chamber 94 and spring 92 urges valve 82 to its closed position blocking flow of fuel vapor from fuel tank 12 to vapor-recovery canister 26. At this stage, no more liquid fuel can be added to fuel tank 12. As also shown in FIG. 11, any pressurized fuel vapor 190 in tubular skirt vapor space 192 can vent back into lower pressure vapor space 186 in fuel tank 12 through upper side wall aperture 146 if necessary.

Figure 12:
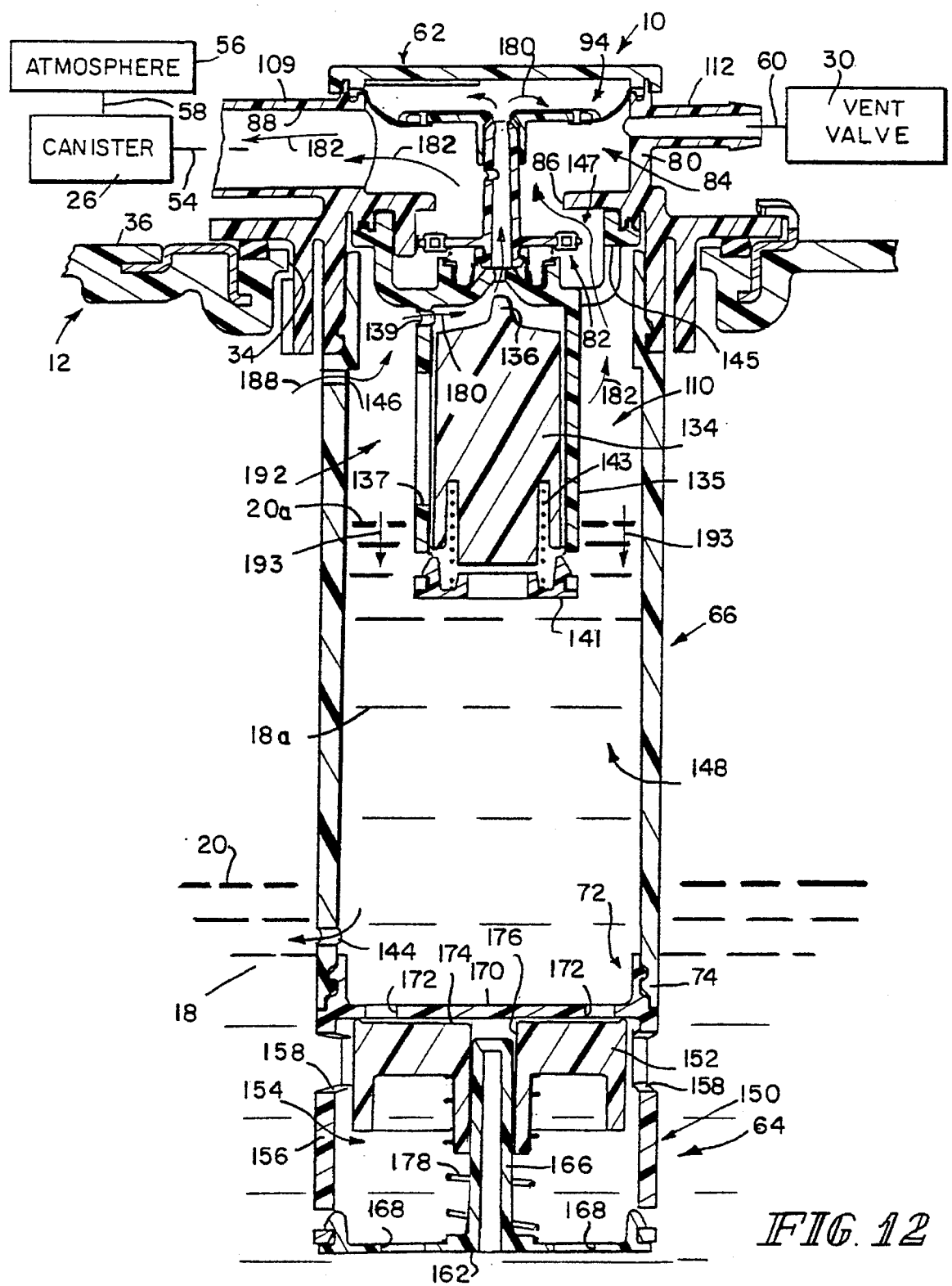
FIG. 12 is a view similar to FIGS. 7–11 showing drainage of some of the liquid fuel from the channel formed in the tubular skirt into the fuel tank through the lower side wall aperture formed in the tubular skirt about thirty seconds after the moment shown in FIG. 11 because of pressure equalization between the large vapor space in the fuel tank and a small vapor space in an upper interior region of the tubular skirt channel facilitated by fuel vapor flow through the upper side wall aperture formed in the tubular skirt.

A short period of time (e.g., about 30 seconds) after movement of rollover float valve to its closed position as shown in FIG. 11, the level 20a of liquid fuel 18a in channel 148 in tubular skirt 66 falls in direction 193 as shown in FIG. 12. Some of the liquid fuel 18a drains out through lower side wall aperture 144 into fuel tank 12 to raise the level 20 of liquid fuel 18 to a point above lower side wall aperture 144 as shown in FIG. 12. At this stage, pressurized fuel vapor 188 in vapor space 186 in fuel tank 12 is now free to vent through upper side wall aperture 146 to venting control chamber 94 and separately to vapor-recovery canister 26 as shown in FIG. 12. Thus, this small hole 146 in the upper portion of tubular skirt 66 functions to allow controlled pressure release from channel 148 and facilitate liquid drainage from and movement in channel 148. Vent valve 30 remains in its closed position at this time.

Figure 13:
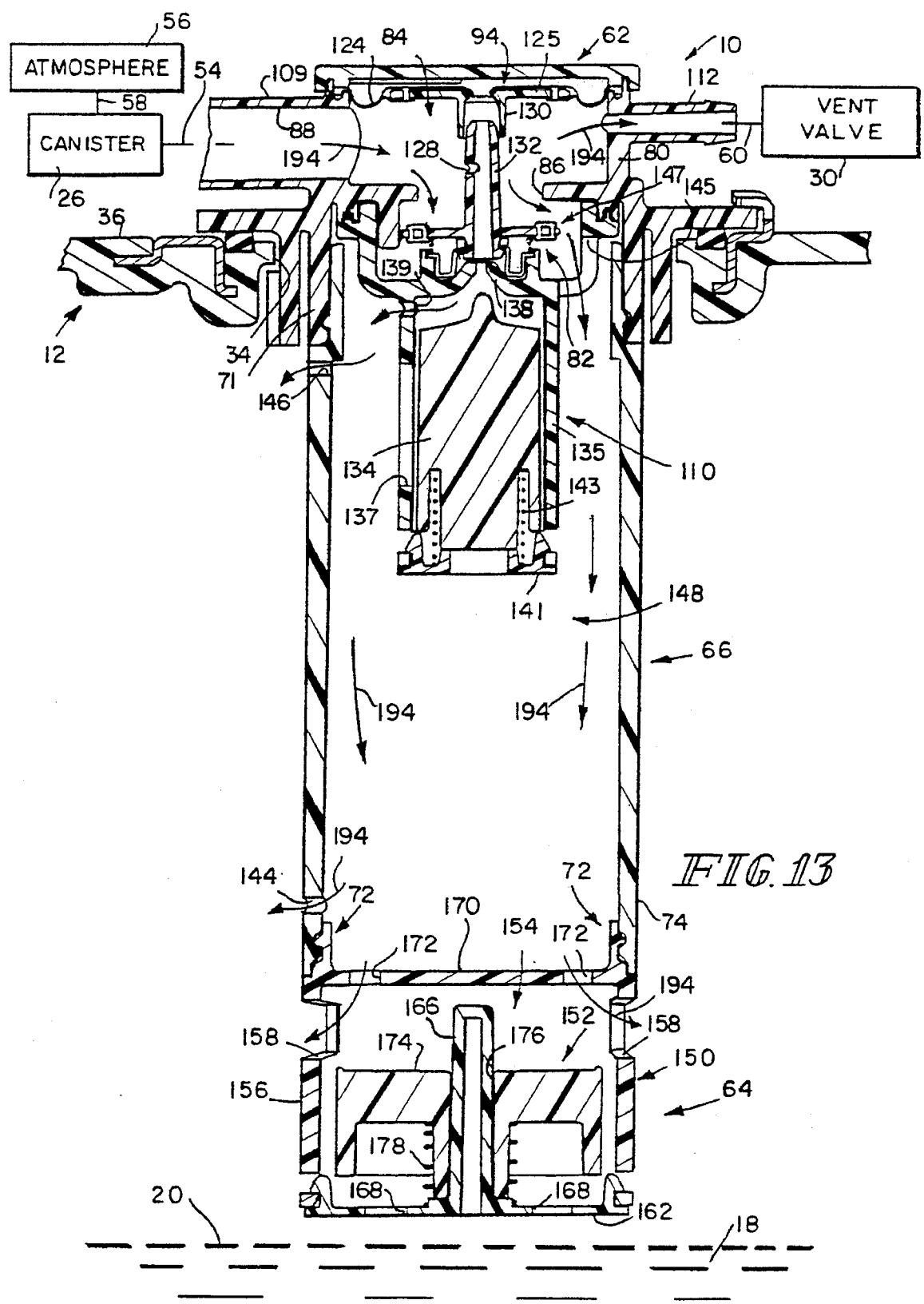
FIG. 13 is a view similar to FIGS. 7–12 showing operation of the valving in the vent apparatus to admit outside air into the fuel tank through the fill-limit and tank ventilation valve assembly of FIG. 1 to relieve an unwanted vacuum condition in the fuel tank.

Fill-limit valve 10 is also able to function as a vacuum-relief valve as shown in FIG. 13. Vacuum in fuel tank 12 is sufficient to apply a suction force to the underside of valve 82. This suction force is great enough in certain circumstances to draw valve 82 downwardly against spring 92 to its opened position as shown in FIG. 13. Air 194 from atmosphere 56 is thus able to pass into fuel tank 12 through vapor-recovery canister and fill-limit valve 10 and vent valve 30.

An auxiliary vent valve 195 is shown in FIGS. 2 and 14. Vent valve 195 includes outlet passage 181 having opening 183 in fuel tank 12 and opposite opening 185 in second outlet 111 as shown in FIG. 14. A poppet valve 187 in second outlet 111 is normally urged against an annular valve seat 189 by a spring 191. Once the magnitude of pressure in fuel tank 12 reaches a high enough level, the fuel vapor pressure can urge poppet valve 187 against spring 189 to an opened position as shown in FIG. 14 and vent pressurized fuel vapor 196 directly to atmosphere 57.

Although the invention has been described and defined with reference to certain preferred embodiments, variations and modifications exist within the scope and spirit of the invention as described and defined in the following claims.

We claim:

1. A venting control system for a fuel tank, the system comprising a vent apparatus configured to be coupled to the fuel tank, the vent apparatus being formed to include a vapor inlet opening configured for communicating with an interior region of the fuel tank, a vapor outlet opening, a passageway interconnecting the vapor inlet opening and the vapor outlet opening, and a pressure-relief valve assembly regulating flow of pressurized fuel vapor into the passageway through the vapor inlet opening, a rollover valve assembly coupled to the pressure-relief valve assembly to extend downwardly therefrom, a skirt extending around the rollover valve assembly and the vapor inlet opening in the vent apparatus to define a channel lying around the rollover valve assembly, the skirt being formed to include a skirt inlet for admitting fuel vapor into the channel, and a fill-limit valve assembly coupled to the skirt and positioned to lie adjacent to the skirt inlet, the fill-limit valve assembly including a float valve movable between an opened position allowing flow of fuel vapor into the channel through the skirt inlet and a closed position preventing flow of fuel vapor into the annular channel through the skirt inlet.

2. The system of claim 1, wherein the fill-limit valve assembly includes a fill-limit valve housing appended to a lowermost end of the skirt and the float valve is positioned inside an interior region of the fill-limit valve housing for movement between said opened and closed positions.

3. The system of claim 2, wherein the fill-limit valve housing includes a ceiling mounted in the skirt inlet and formed to include at least one inlet port interconnecting the interior region of the fill-limit valve housing and the channel in the skirt in fluid communication.

4. The system of claim 3, wherein the float valve includes a top wall positioned to engage the ceiling and close each inlet port formed in the ceiling to block liquid flow therethrough in response to movement of the float valve to the closed position.

5. The system of claim 3, wherein the fill-limit valve housing further includes a side wall depending from the ceiling and extending around the float valve and the side wall is formed to include at least one fuel vapor inlet port communicating with the interior region of the fill-limit valve housing.

6. The system of claim 3, wherein the fill-limit valve housing further includes a floor arranged to lie in vertically spaced-apart relation to the ceiling to position the movable float valve therebetween and an upstanding valve guide post appended to the floor and the movable float valve is formed to include a passageway receiving the upstanding valve guide post therein.

7. The system of claim 3, wherein the fill-limit valve housing includes a side wall depending from the ceiling and defining a chamber receiving the movable float valve therein and an upstanding annular flange extending upwardly from the ceiling toward the rollover valve assembly and engaging the lowermost end of the skirt.

8. The system of claim 3, wherein the skirt includes an annular side wall formed to include an aperture configured to communicate fuel vapor into the channel and positioned to lie between the ceiling and the rollover valve assembly in coextensive relation with a top surface of liquid fuel in the fuel tank equal to a predetermined maximum fuel capacity of the fuel tank.

9. The system of claim 2, wherein the fill-limit valve housing includes a flange engaging the lowermost end of the skirt and a side wall depending from the flange and defining a chamber receiving the movable float valve therein.

10. The system of claim 9, wherein the fill-limit valve housing further includes a ceiling formed to include at least one inlet port interconnecting the interior region of the fill-limit valve housing and the channel in the skirt in fluid communication.

11. The system of claim 9, wherein the lowermost end of the skirt includes a mounting section and the flange of the fill-limit valve housing includes snap-connectors located on the mounting portion and configured to snap onto and engage the mounting section to establish a fixed position of the fill-limit valve housing under the skirt inlet.

12. The system of claim 11, wherein the fill-limit valve housing further includes snap-connectors located on an uppermost end of the skirt and configured to snap onto and engage the vent apparatus to establish a fixed position of the skirt under the vapor inlet opening of the vent apparatus.

13. The system of claim 2, wherein the skirt has a vertical central axis extending therethrough and the fill-limit valve housing further includes guide means for guiding the float valve during movement of the float valve between said opened and closed positions so that the float valve is constrained to move vertically in the fill-limit valve housing along the vertical central axis.

14. The system of claim 13, wherein the fill-limit valve housing includes a floor positioned to lie under the float valve and in spaced-apart relation to the lowermost end of the skirt, the float valve is formed to include a central aperture extending therethrough, and the guide means includes an upstanding valve guide post appended to the floor and arranged to pass through the central aperture formed in the movable float valve.

15. The system of claim 2, wherein the skirt includes an annular side wall formed to include a lower vent aperture configured to communicate fuel vapor into the channel and positioned to lie between the lowermost end of the skirt and the rollover valve assembly in coextensive relation with a top surface of liquid fuel in the fuel tank equal to a predetermined maximum fuel capacity of the fuel tank.

16. The system of claim 15, wherein the annular side wall includes an upper end coupled to the vent apparatus and formed to include an upper vent aperture configured to vent fuel vapor into and out of the annular channel and positioned to lie in horizontally spaced-apart relation to the rollover valve assembly.

17. An apparatus for controlling discharge of fuel vapor from within a vehicle fuel tank, the apparatus comprising a valve housing adapted to be mounted in a top wall of the fuel tank, the valve housing being formed to include a vapor inlet opening adapted for communicating with an interior region of the fuel tank, a vapor outlet opening, and a passageway interconnecting the vapor inlet opening and the vapor outlet opening, a flow control valve disposed in the valve housing and movable between an opened position allowing flow of fuel vapor through the vapor outlet opening and a closed position preventing flow of fuel vapor through the vapor outlet opening, a skirt adapted to be positioned to lie inside the fuel tank and extending around the valve housing and the vapor inlet opening in the valve housing to define a channel lying around the valve housing and adapted to conduct fuel vapor from the interior region of the fuel tank to the vapor inlet opening, the skirt having a bottom edge adapted to lie in spaced-apart relation to the top wall of the fuel tank and the vapor inlet opening in the valve housing being adapted to be located in a position between the top wall of the fuel tank and the bottom edge of the skirt, the bottom edge of the skirt being positioned to lie in coextensive relation with a top surface of liquid fuel in the interior region of the fuel tank is equal to a predetermined fuel capacity of the fuel tank, and a fill-limit valve assembly coupled to the skirt to lie adjacent to the bottom edge of the skirt, the fill-limit valve assembly including a float valve movable between an opened position allowing flow of fuel vapor from the interior region of the fuel tank into the channel through an inlet formed in the skirt and a closed position preventing flow of fuel vapor from the interior region of the fuel tank into the channel through the inlet formed in the skirt.

18. The apparatus of claim 17, wherein the valve housing further includes a top wall adapted to be coupled to the top wall of the fuel tank and the skirt includes an annular side wall coupled to the top wall of the valve housing by a coupling and positioned to surround the valve housing and define the channel therebetween.

19. The apparatus of claim 18, wherein the coupling includes at least one snap-connector.

20. The apparatus of claim 18, wherein the annular side wall includes the bottom edge and a top edge adjacent to the top wall and positioned to lie in spaced-apart relation to the bottom edge, and the apparatus further comprises a first snap-connector coupled to the top edge and the valve housing and a second snap-connector coupled to the bottom edge and the fill-limit valve assembly.

21. The apparatus of claim 17, wherein the bottom edge is an endless annular rim defining the inlet formed in the skirt.

22. The apparatus of claim 21, wherein the fill-limit valve assembly further includes a fill-limit valve housing appended to the bottom edge of the skirt, the float valve is positioned inside an interior region of the fill-limit valve housing for movement between the opened and closed positions, and the fill-limit valve housing includes a ceiling mounted in the skirt inlet and formed to include at least one inlet port interconnecting the interior region of the fill-limit valve housing and the channel in the skirt in fluid communication.

23. The apparatus of claim 22, wherein the float valve includes a top wall positioned to engage the ceiling and close each inlet port formed in the ceiling to block liquid flow therethrough in response to movement of the float valve to the closed position.

24. The apparatus of claim 22, wherein the fill-limit valve housing further includes a side wall depending from the ceiling and extending around the float valve and the side wall is formed to include at least one fuel vapor inlet port communicating with the interior region of the fill-limit valve housing.

25. The apparatus of claim 22, wherein the fill-limit valve housing further includes a floor arranged to lie in vertically spaced-apart relation to the ceiling to position the movable float valve therebetween and an upstanding valve guide post appended to the floor and the movable float valve is formed to include a passageway receiving the upstanding valve guide post therein.

26. An apparatus for controlling discharge of fuel vapor from a vehicle fuel tank, the apparatus comprising a valve housing adapted to be mounted in a top wall of the fuel tank, the valve housing being formed to include a vapor inlet opening adapted for communicating with an interior region of the fuel tank, a vapor outlet opening, and a passageway interconnecting the vapor inlet opening and the vapor outlet opening, the valve housing being formed to include a top end including the vapor outlet opening and an opposite bottom end, a flow control valve disposed in the valve housing and movable between an opened position allowing flow of fuel vapor through the vapor outlet opening and a closed position preventing flow of fuel vapor through the vapor outlet opening, means for conducting fuel vapor to the vapor inlet opening formed in the valve housing, the conducting means including a tubular skirt member positioned to lie adjacent to the valve housing and configured to define a skirt inlet for conducting fuel vapor to the vapor inlet opening from a point below the vapor inlet opening, and a fill-limit valve assembly positioned to lie adjacent to the skirt inlet, the fill-limit valve assembly including a fill-limit valve housing having an interior region and a float movable in the fill-limit valve housing between an opened position allowing flow of fuel vapor into the conducting means through the skirt inlet and a closed position preventing flow of fuel vapor into the conducting means through the skirt inlet.

27. The apparatus of claim 26, wherein the valve housing further includes a top wall adapted to be coupled to the top wall of the fuel tank and the conducting means includes an annular side wall coupled to the top wall of the valve housing by a coupling and positioned to surround the valve housing and define a portion of the conducting means therebetween.

28. The apparatus of claim 27, wherein the coupling includes at least one snap-connector.

29. The apparatus of claim 27, wherein the annular side wall includes a lowermost end and an uppermost end adjacent to the top wall and positioned to lie in spaced-apart relation to the lower most end, and the apparatus further comprises a first snap-connector coupled to the uppermost end and the valve housing and a second snap-connector coupled to the lower most end and the fill-limit valve assembly.

30. The apparatus of claim 26, wherein the lowermost end includes an endless annular rim defining the skirt inlet.

31. The apparatus of claim 26, wherein the fill-limit valve assembly further includes a fill-limit valve housing appended to the bottom edge of the skirt, the float valve is positioned inside an interior region of the fill-limit valve housing for movement between the opened and closed positions and the fill-limit valve housing includes a ceiling mounted in the skirt inlet and formed to include at least one inlet port interconnecting the interior region of the fill-limit valve housing and the conducting means in the skirt in fluid communication.

32. The apparatus of claim 31, wherein the float valve includes a top wall positioned to engage the ceiling and close each inlet port formed in the ceiling to block liquid flow therethrough in response to movement of the float valve to the closed position.

33. The apparatus of claim 31, wherein the fill-limit valve housing further includes a side wall depending from the ceiling and extending around the float valve and the side wall is formed to include at least one fuel vapor inlet port communicating with the interior region of the fill-limit valve housing.

34. The apparatus of claim 31, wherein the fill-limit valve housing further includes a floor arranged to lie in vertically spaced-apart relation to the ceiling to position the movable float valve therebetween and an upstanding valve guide post appended to the floor and the movable float valve is formed to include a passageway receiving the upstanding valve guide post therein.

35. A venting control system for a fuel tank, the system comprising a vent apparatus configured to be coupled to the fuel tank, the vent apparatus being formed to include a vapor inlet opening configured for communicating with an interior region of the fuel tank, a vapor outlet opening, a passageway interconnecting the vapor inlet opening and the vapor outlet opening, and a pressure-relief valve assembly regulating flow of pressurized fuel vapor into the passageway through the vapor inlet opening, a rollover valve assembly coupled to the pressure-relief valve assembly to extend downwardly therefrom, a tubular skirt extending around the rollover valve assembly and the vapor inlet opening in the vent apparatus to define a channel lying around the rollover valve assembly, the tubular skirt including an uppermost end formed to include a skirt outlet communicating with the vapor inlet opening in the vent apparatus and a lowermost end formed to include a skirt inlet for admitting fuel vapor into the channel, first snap-connector means for snap-connecting the uppermost end of the skirt to the vent apparatus to interconnect the channel in the skirt and the vapor inlet opening in the vent apparatus in fluid communication, a fill-limit valve assembly positioned to lie adjacent to the skirt inlet, the fill-limit valve assembly including a fill-limit valve housing having an interior region and a float valve movable in the fill-limit valve housing between an opened position allowing flow of fuel vapor into the channel through the skirt inlet and a closed position preventing flow of fuel vapor into the channel through the skirt inlet, and second snap-connector means for snap-connecting the lowermost end of the skirt to the fill-limit valve housing of the fill-limit valve assembly to interconnect the channel in the skirt and the interior region in the fill-limit valve housing in fluid communication through the skirt inlet.

36. The system of claim 35, wherein the fill-limit valve housing includes a ceiling mounted in the skirt inlet and formed to include at least one inlet port interconnecting the interior region of the fill-limit valve housing and the channel in the skirt in fluid communication and a portion of the second snap-connector means is appended to the ceiling.

37. The system of claim 36, wherein the float valve includes a top wall positioned to engage the ceiling and close each inlet port formed in the ceiling to block liquid flow therethrough in response to movement of the float valve to the closed position.

38. The system of claim 36, wherein the fill-limit valve housing further includes a side wall depending from the ceiling and extending around the float valve and away from the second snap-connector means and the side wall is formed to include at least one fuel vapor inlet port communicating with the interior region of the fill-limit valve housing.

39. The system of claim 36, wherein the fill-limit valve housing further includes a floor arranged to lie in vertically spaced-apart relation to the ceiling to position the movable float valve therebetween and an upstanding valve guide post appended to the floor and the movable float valve is formed to include a passageway receiving the upstanding valve guide post therein.

40. The system of claim 36, wherein the skirt includes an annular side wall formed to include an aperture configured to communicate fuel vapor into the channel and positioned to lie between the ceiling and the rollover valve assembly in coextensive relation with a top surface of liquid fuel in the fuel tank equal to a predetermined maximum fuel capacity of the fuel tank and the second snap-connector means is positioned to lie in a space between the aperture and the float valve.

41. A venting control system for a fuel tank, the system comprising a vent apparatus configured to be coupled to the fuel tank, the vent apparatus being formed to include a vapor inlet opening configured for communicating with an interior region of the fuel tank, a vapor outlet opening, a passageway interconnecting the vapor inlet opening and the vapor outlet opening, a tubular skirt formed to include an interior region and including an uppermost end formed to include a skirt outlet communicating with the vapor inlet opening in the vent apparatus and a lowermost end formed to include a skirt inlet for admitting fuel vapor into the interior region of the tubular skirt, a first snap-connector coupled to the uppermost end of the skirt and the vent apparatus to interconnect the interior region in the skirt and the vapor inlet opening in the vent apparatus in fluid communication, a fill-limit valve assembly positioned to lie adjacent to the skirt inlet, the fill-limit valve assembly including a fill-limit valve housing having an interior region and a float valve movable in the fill-limit valve housing between an opened position allowing flow of fuel vapor into the interior region of the tubular skirt through the skirt inlet and a closed position preventing flow of fuel vapor into the interior region of the tubular skirt through the skirt inlet, and a second snap-connector coupled to the lowermost end of the skirt and the fill-limit valve housing of the fill-limit valve assembly to interconnect the interior region in the skirt and the interior region in the fill-limit valve housing in fluid communication through the skirt inlet.

42. The system of claim 41, wherein the fill-limit valve housing includes a ceiling mounted in the skirt inlet and formed to include at least one inlet port interconnecting the interior region of the fill-limit valve housing and the interior region in the skirt in fluid communication and a portion of the second snap-connector is appended to the ceiling.

43. The system of claim 42, wherein the float valve includes a top wall positioned to engage the ceiling and close each inlet port formed in the ceiling to block liquid flow therethrough in response to movement of the float valve to the closed position.

44. The system of claim 42, wherein the fill-limit valve housing further includes a side wall depending from the ceiling and extending around the float valve and away from the second snap-connector and the side wall is formed to include at least one fuel vapor inlet port communicating with the interior region of the fill-limit valve housing.

45. The system of claim 42, wherein the fill-limit valve housing further includes a floor arranged to lie in vertically spaced-apart relation to the ceiling to position the movable float valve therebetween and an upstanding valve guide post appended to the floor and the movable float valve is formed to include a passageway receiving the upstanding valve guide post therein.

46. The system of claim 42, wherein the skirt includes an annular side wall formed to include an aperture configured to communicate fuel vapor into the interior region of the skirt and positioned to lie between the ceiling and the rollover valve assembly in coextensive relation with a top surface of liquid fuel in the fuel tank equal to a predetermined maximum fuel capacity of the fuel tank and the second snap-connector is positioned to lie in a space between the aperture and the float valve.

* * * * *